Patented Aug. 13, 1940

2,211,302

UNITED STATES PATENT OFFICE 2,211,302

CATALYST PRODUCTION

John Turkevich, Princeton, and Robert F. Ruthruff, Nutley, N. J., assignors to Process Management Company, Inc., New York, N. Y., a corporation of Delaware No Drawing. Application December 24, 1937, Serial No. 181,598

8 Claims. (Cl. 23—236)

This invention relates to the catalytic treatment of hydrocarbons and the production of a chromium oxide catalyst therefor. The invention relates particularly to the treatment of hydrocarbons to change the carbon-hydrogen ratio thereof and otherwise change their molecular structure to produce other hydrocarbons of substantially unchanged molecular weight but having different physical and chemical properties and the production of a chromium oxide catalyst therefor.

The present invention contemplates the production of a chromium oxide catalyst by the reduction of chromium trioxide to an oxide of chromium of lower valence in a process wherein the reagents used and the reaction conditions are controlled to produce a dark gelatinous reduction product which may be dried under proper conditions to form black vitreous masses of superior catalytic activity.

The invention further contemplates the selection of a reducing agent for the chromium trioxide and the maintenance of the reaction conditions whereby the by-products of the reduction reaction and any excess of the reducing agent are substantially eliminated from the reduction reaction products, or whereby such by-products and/or such excess reducing agent are easily separable from the chromium oxide reduction reaction product.

Chromium trioxide is preferably employed in the form of an aqueous solution to which the reducing agent selected may be added. Any reducing agent which may be reacted with chromium trioxide to reduce the latter to the desired degree may be employed but, as stated above, it is preferable to use a reducing agent which will not cause difficulties in recovering the chromium oxide reduction product from the reaction products. For example, it is preferable to employ a reducing agent which is itself volatile at relatively low temperatures and forms oxidation by-products which are themselves volatile at relatively low temperatures, that is, the low boiling alcohols and aldehydes. The reducing agent may also be one which decomposes to form water and volatile matter and forms similar oxidation by-products, for example, oxalic acid. Other reagents which are highly reactive and form removable or innocuous oxidation by-products may be used; for example sucrose.

It will be understood, however, that the particular reducing agent selected is not so important as the selection of a reducing agent which will accomplish the desired reduction and permit easy recovery of the chromium oxide reduction reaction product.

In connection with the present invention it has been further discovered that the reduction of the chromium trioxide should be accomplished by means of such a reducing agent or under such reaction conditions that the chromium trioxide is reduced sufficiently to form the desired product. For example, in the reduction of chromium trioxide in aqueous solution by means of ethyl alcohol it has been found that a primary reduction product may be formed which prevents further reduction under ordinary conditions and which is unsuitable for the production of the black vitreous catalyst desired. It has been found, however, that the use of a reducing agent of greater activity, increasing the amount of reducing agent, increasing the temperature of the reaction, or increasing the period of application of heat in the presence of the reducing agent will be sufficient generally to insure the desired results when, under the conditions previously selected, the degree of reduction is insufficient and results in the undesired micro-crystalline precipitate which dries to form the undesired brown reduction product.

The undesired intermediate reduction product may be chromium chromate, and the following discussion may explain the mechanism whereby the formation of this product interferes with the production of the desired catalytic material. It is to be understood, however, that the invention is not limited in any manner by any theory regarding the constitution or function of this undesired intermediate product.

On treating chromium trioxide with alcohol a part of the chromium may be reduced from the hexavalent form to the trivalent form, and this trivalent chromium oxide may be combined with unchanged chromium trioxide to form chromium chromate ($Cr_5O_{12}$ or $Cr_2(CrO_4)_3$). This compound apparently forms what may be termed a reduction barrier, and a higher reduction potential is required to convert it to a compound in which the chromium has a lower valence. That is, in the reduction of chromium trioxide with alcohol, chromium chromate forms if reduction conditions are mild throughout while the desired gelatinous chromium oxide forms if the conditions are more strenuous. For example, when a mixture of a relatively dilute aqueous solution of chromium trioxide and alcohol is heated to promote the reduction reaction the formation of the chromium chromate inhibits the further reduction of the oxide, and the excess alcohol is merely driven off by further heating. It has been found that if such a solution is maintained under conditions whereby it is heated in the continued presence of the alcohol reducing agent the undesired intermediate reduction product is further reduced or its formation is inhibited, and the chromium trioxide is reduced to the desired degree to form a dark, almost black, gelatinous product which may be dried to form the black vitreous catalyst.

Preferably the concentration of the reagents used should be regulated whereby the solution, after being heated to promote the reduction reaction and remove volatile by-products, contains at least six grams of chromium per liter, for example, 40 grams of chromium per liter. Under these conditions the reduction of the trioxide to the desired degree converts the solution to a jelly which may be most easily handled for further operations, such as washing and drying the jelly to form black vitreous masses. Before drying or after partial drying the jelly may be washed with water to remove soluble undesired by-products.

The invention will be further described with reference to specific examples, but it is to be understood that it is capable of other modifications than those set forth in the specific examples and is not limited thereby.

Example I 160 grams of chromium trioxide are dissolved in 2000 cc. of water. Eight 10 cc. portions of ethyl alcohol are added at five-minute intervals. The solution is allowed to stand for four hours, after which an equal amount of the alcohol is added in the same manner. The solution is then heated under reflux for about 15 hours, after which time it sets to a dark brown, almost black, jelly. The jelly may be broken up by agitation and excess water removed by filtration. The partially dried jelly may then be further dehydrated at 110° C., whereby the black vitreous form is obtained. Further catalyst may be recovered by evaporating the filtrate to dryness, or if desired this liquor may be used to replace an equivalent amount of water in the preparation of a second batch of catalyst.

In the preceding example the heating under reflux for an extended period is necessary to secure the desired degree of reduction of the trioxide. If, instead, the solution is merely permitted to stand an equivalent length of time and then is heated to drive off excess reducing agent and volatile by-products, the precipitate is microcrystalline rather than gelatinous, and on being dried is in the form of brown lumps unsuitable for the purposes of this invention.

The physical differences between the desired black vitreous reduction product useful for catalytic reactions and the undesired brown modification described just above are further apparent on observing their behavior under the application of heat. The black vitreous catalyst is stable at 300° C. without any apparent change beyond a slight shattering of the pieces. The undesired brown modification decomposes at temperatures considerably below 300° C. For example, on heating this modification to a temperature of about 220° C. decomposition begins, and the reaction is exothermic and proceeds throughout the mass with occasional flashes of light, and the brown mass is changed completely to a black, impalpable powder, which may be chromium chromite. On the other hand, the black vitreous catalyst is stable at 300° C., and on heating it to considerably higher temperatures it undergoes the glow phenomenon with the evolution of heat and water. On further heating until the whole mass is at a bright red heat and then cooling, the resultant material has the same appearance as the original except for a very slight greenish cast and the previously-mentioned slight shattering of the pieces.

It will be understood that the proper conditions for carrying out the reduction of the trioxide to the desired degree may vary considerably inasmuch as the reaction is affected by the concentration of the aqueous chromium trioxide solution, by the nature and proportion of reducing agent employed, by the temperature at which the mixture is maintained, and by the length of the period during which the mixture is maintained at the proper temperature. For this reason no specific directions can be given which would include all conditions of operation. However, it is sufficient if it is understood that the reduction reaction should be carried out under proper conditions and to a degree whereby a dark almost black gelatinous precipitate is obtained; which precipitation, under proper concentration of the chromium, converts the mixture to a dark, almost black, jelly.

Proper specific directions for carrying out the reduction to obtain the desired product are given in the foregoing and subsequent examples, and it is believed that the determination of the proper conditions for other reducing agents and for other concentrations of the chromium trioxide solution may be readily determined by those skilled in the art; it being understood that the reaction should be carried out to obtain a dark, almost black, gelatinous product which may be dried to produce the desired black vitreous catalytic masses, in contrast to the microcrystalline precipitate, which dries to form the undesired brown modification, resulting from insufficient reduction of the trioxide.

Example II 80 grams of chromium trioxide are dissolved in 500 cc. of water in a container provided with a reflux condenser. 50 cc. of methyl alcohol are then added in small portions. This causes the solution to heat up slightly and turn brown. The solution is then heated under reflux for about 6 hours, and then about 20 cc. more of methyl alcohol are added. The solution is again heated under reflux for several hours after which the solution sets to form a solid brown gelatinous mass or jelly. The jelly is dried for several hours at 110° C. to convert it to black vitreous masses suitable for use as catalyst material.

Example III 80 grams of chromium trioxide are dissolved in 500 cc. of water. 13 grams of oxalic acid dissolved in 200 cc. of water are added slowly over a period of several hours. Gas is evolved, and the solution turns to a dark color. On further standing the solution sets to a dark almost black gelatinous mass or jelly which on drying at about 100° C. is converted to the black vitreous form desired as a catalyst.

Example IV 80 grams of chromium trioxide are dissolved in 500 cc. of water. 75 cc. of formalin are added in small portions, and a violent reaction takes place. The solution is then heated gently for several hours after which it sets to a dark brown almost black gelatinous mass or jelly which may be dried at 110° C. for several hours to convert it to the black vitreous form for desired catalytic use.

The catalyst reduced according to the present invention, that is, the black vitreous chromium oxide catalyst, may be used for changing the carbon-hydrogen ratio of hydrocarbons and for effecting other changes in their molecular structure by passing a stream of hydrocarbons over the catalyst at a temperature of 325° to 625° C. It is preferable, however, to operate the catalyst at a temperature of 450° to 550° C. For example, in passing heptane at the rate of 0.42 cc. (liquid basis) per minute over 25 grams of the new catalyst at a temperature of 475° C. the gas production after 5 minutes amounts to 125 cc. per minute and after 60 minutes the gas production amounts to 80 cc. per minute, the composition of the gas being 86% hydrogen and the remainder principally methane. Over a five-hour period gas production represents an increase of 114% over the best results obtainable from the catalytic treatment of heptane by means of other chromium oxide catalysts. Before passing the stream of hydrocarbons over the catalyst it is advantageous to condition the catalyst by heating it in an atmosphere of hydrogen, for example at the operating temperature. It is convenient to pass a stream of hydrogen over the catalyst body while raising it to the operating temperature.

The present invention provides an improved method of producing a chromium oxide catalyst of superior catalytic activity and a method of changing the carbon-hydrogen ratio of hydrocarbons, which is a substantial improvement over prior practice.

The invention has been described with reference to specific examples but, as indicated above, the invention is not limited to these specific examples but is capable of many other specific embodiments and modifications and is not to be limited in any way by said specific examples.

We claim:

1. The method of preparing a chromium oxide catalyst which comprises reacting in aqueous solution chromium trioxide and a reducing agent therefor of sufficient activity to effect reduction of chromium chromate and at a temperature sufficiently high for a sufficient length of time to reduce substantially all the chromium chromate formed by the reduction of chromium trioxide in the reaction to precipitate a gelatinous chromium oxide reduction product substantially free from chromium chromate, and drying said gelatinous product to form vitreous masses suitable for use as catalytic material.

2. The method in accordance with claim 1 wherein an alcohol is employed as said reducing agent in sufficient quantity under the reaction conditions to effect the desired reduction reaction.

3. The method in acordance with claim 1 wherein methyl alcohol is employed as said reducing agent.

4. The method in accordance with claim 1 wherein ethyl alcohol is employed as said reducing agent.

5. The method in accordance with claim 1 wherein oxalic acid is employed as said reducing agent.

6. The method in accordance with claim 1 wherein an alcohol is employed as said reducing agent and the reaction temperature is maintained by heating the solution under reflux.

7. The method in accordance with claim 1 wherein the concentration of the chromium oxide solution is maintained sufficiently high whereby the solution contains after the heating operation at least six grams of chromium per liter of solution whereby said solution sets after heating to form a jelly.

8. The method in accordance with claim 1 wherein said chromium trioxide is prepared in the form of a solution containing approximately 40 grams of chromium per liter of solution and an alcohol reducing agent is employed to effect the desired reduction.

JOHN TURKEVICH.
ROBERT F. RUTHRUFF.